United States Patent [19]

Kondou

[11] Patent Number: 5,355,500
[45] Date of Patent: Oct. 11, 1994

[54] MULTIPROCESSOR SYSTEM FOR CONDUCTING INITIAL PROCESSING FOR SHARED CIRCUIT

[75] Inventor: Seiji Kondou, Tokyo, Japan

[73] Assignee: NEC Corporation, Japan

[21] Appl. No.: 919,089

[22] Filed: Jul. 23, 1992

[30] Foreign Application Priority Data

Jul. 26, 1991 [JP] Japan .................. 3-187915

[51] Int. Cl.⁵ .......................................... G06F 13/376
[52] U.S. Cl. ........................ 395/725; 364/229; 364/229.2; 364/230; 364/240; 364/240.1; 364/228.3; 364/DIG. 1
[58] Field of Search .............. 395/725, 325, 425, 275; 370/85.2; 340/825.5; 371/9.1

[56] References Cited

U.S. PATENT DOCUMENTS

| | | | |
|---|---|---|---|
| 4,375,639 | 3/1983 | Johnson, Jr. .................. | 340/825.5 |
| 4,587,609 | 5/1986 | Boudreau et al. ............ | 364/200 |
| 4,608,631 | 8/1986 | Siffler et al. .................. | 395/325 |
| 4,620,278 | 10/1986 | Ellsworth et al. ............ | 364/200 |
| 4,621,318 | 11/1986 | Maeda ........................... | 395/425 |
| 5,070,450 | 12/1991 | Holman, Jr. et al. ......... | 395/750 |
| 5,202,973 | 4/1993 | Ramamjan et al. ........... | 395/425 |

*Primary Examiner*—Gopal C. Ray
*Attorney, Agent, or Firm*—Ostrolenk, Faber, Gerb & Soffen

[57] ABSTRACT

A multiprocessor system having a plurality of microprocessors includes an OR gate for ORing read signals from the microprocessors and a unit for receiving an output signal from the OR gate and producing an initial processing permission signal, thereby selecting a microprocessor to conduct an initial processing for a shared circuit. In concurrence with the operation monitoring the initial processing permission signal, each microprocessor simultaneously outputs a read signal. The OR gate generates an output signal on receiving a read signal. This changes the initial processing permission signal thus produced by the unit from the permission state to the inhibit state. The microprocessor monitors the initial processing permission signal to conduct the initial processing for the shared circuit only when the signal is in the permission state. Even when there exists a microprocessor in an abnormal state, the multiprocessor system can be set to the operable state by another microprocessor.

3 Claims, 3 Drawing Sheets

MULTIPROCESSOR SYSTEM FOR CONDUCTING INITIAL PROCESSING FOR SHARED CIRCUIT

BACKGROUND OF THE INVENTION

The present invention relates to a multiprocessor system including a plurality of microprocessors, and in particular, to a multiprocessor system including a plurality of microprocessors in which a microprocessor selected therefrom performs an initial processing for a circuit to be shared thereamong.

DESCRIPTION OF THE RELATED ART

A multiprocessor system is in general constituted of a plurality of microprocessors in which the initial processing is conducted by the microprocessors in a distributed fashion.

In a case where an operation such as a memory check is carried out on a circuit to be shared among the microprocessors, it is necessary to select a given microprocessor to carry out the initial processing for the shared circuit via a shared control line for the following reason. Namely, if the plural microprocessors simultaneously conduct the initial processing for the shared circuit, signals from the respective microprocessors can collide with each other on the shared control line, which can lead the multiprocessor system to an inoperable state.

To overcome this difficulty, in a conventional multiprocessor system, either one of the plural microprocessors is connected to a grounding (GND) potential, for example, by a switching circuit such that the pertinent microprocessor monitors the GND signal and the other microprocessors do not monitor the GND signal, thereby enabling the microprocessor monitoring the GND signal to accomplish the initial processing for the shared circuit.

However, in the conventional multiprocessor system, the GND signal is monitored according to the operation of the switching circuit so as to resultantly select the microprocessor to carry out the initial processing for the shared circuit. In consequence, in a case where the microprocessor selected to carry out the initial processing cannot conduct the objective processing due to an abnormal state occurring therein, the multiprocessor system has no chance to be set to the operable state even when other microprocessors are operating in the normal state.

SUMMARY OF THE INVENTION

It is therefore an object of the present invention to provide a multiprocessor system in which even when a failure takes place in a microprocessor, the initial processing can be accomplished by another microprocessor, thereby removing the problem of the conventional multiprocessor system.

In accordance with the present invention, there is provided a multiprocessor system having a plurality of microprocessors and a shared circuit connected via a shared control line to the plurality of microprocessors comprising resetting means for producing a reset signal, OR gate means for generating a logical sum between read signals sent from the microprocessors, and means for receiving a reset signal from the resetting means and being reset by the reset signal, receiving an output signal produced by the OR gate means and a data signal fed from a device external with respect to the multiprocessor system, determining a microprocessor among the plurality of microprocessors to conduct an initial processing for the shared circuit, and producing an initial processing permission signal to inhibit the microprocessors other than the determined microprocessor from achieving the initial processing, wherein each the microprocessor outputs, on receiving the initial processing permission signal, a read signal to the OR gate means so as to carry out the initial processing for the shared circuit when the signal is in a permission state and not to conduct the initial processing for the shared circuit when the signal is in an inhibit state.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
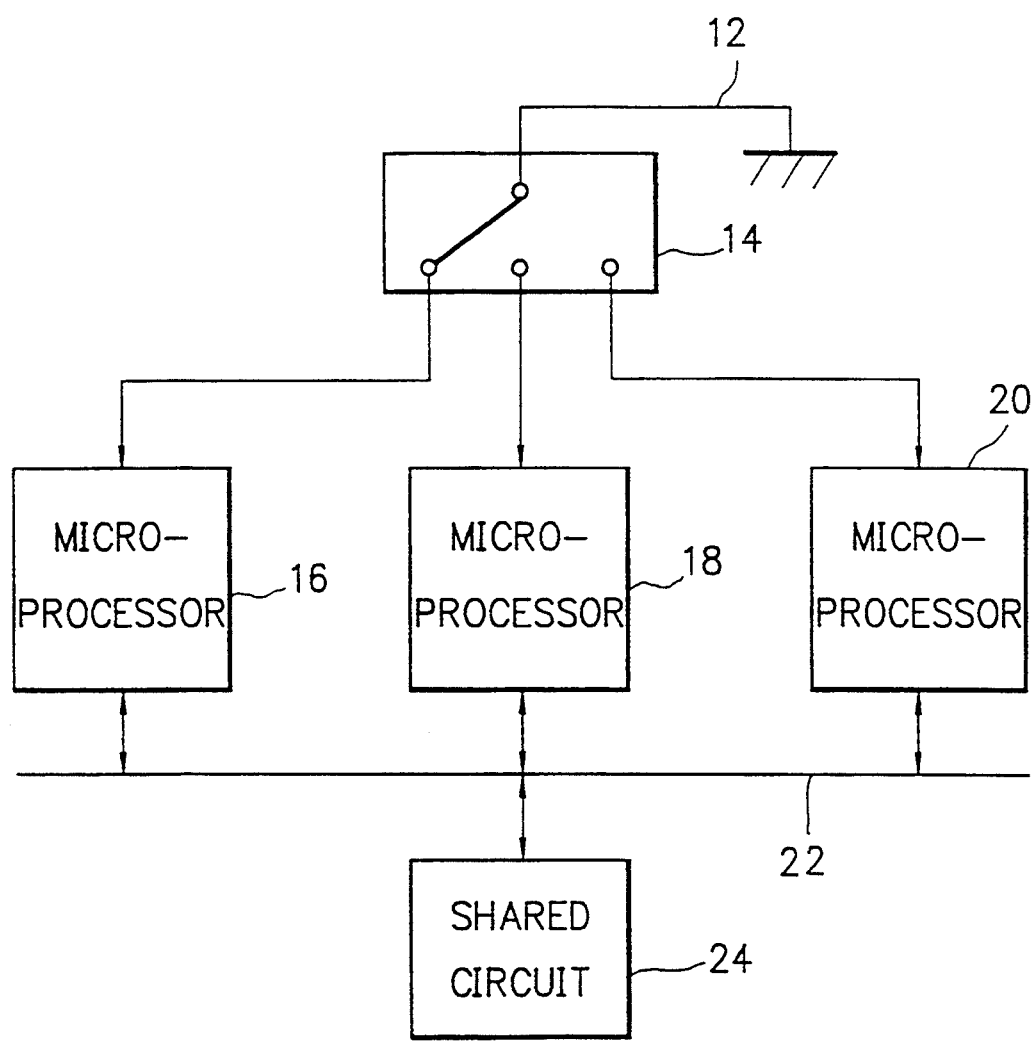
FIG. 1 is a schematic diagram showing the configuration of a conventional multiprocessor system.

Referring to FIG. 1, a conventional multiprocessor system will be described for a better understanding of this invention. The system of FIG. 1 includes a switching circuit 14, microprocessors 16, 18, and 20, and a shared circuit 24. In the switching circuit 14, a terminal is connected to a grounding potential and another terminal is connected, for example, to the microprocessor 16 as shown in FIG. 1, thereby allowing the microprocessor 16 to monitor a GND signal and inhibiting the microprocessors 18 and 20 from monitoring the GND signal. Resultantly, only the microprocessor 16 monitoring the GND signal accomplishes the initial processing such as a memory check for the shared circuit 24 via a shared control line 22.

In this system, however, since the GND signal is monitored according to the operation of the switching circuit 14 to select the microprocessor which conducts the initial processing, when a failure occurs, for example, in the microprocessor monitoring the GND signal and hence the initial processing cannot be processed by this microprocessor, the system cannot be started at all even when the other microprocessors are operating in the normal state.

Figure 2:
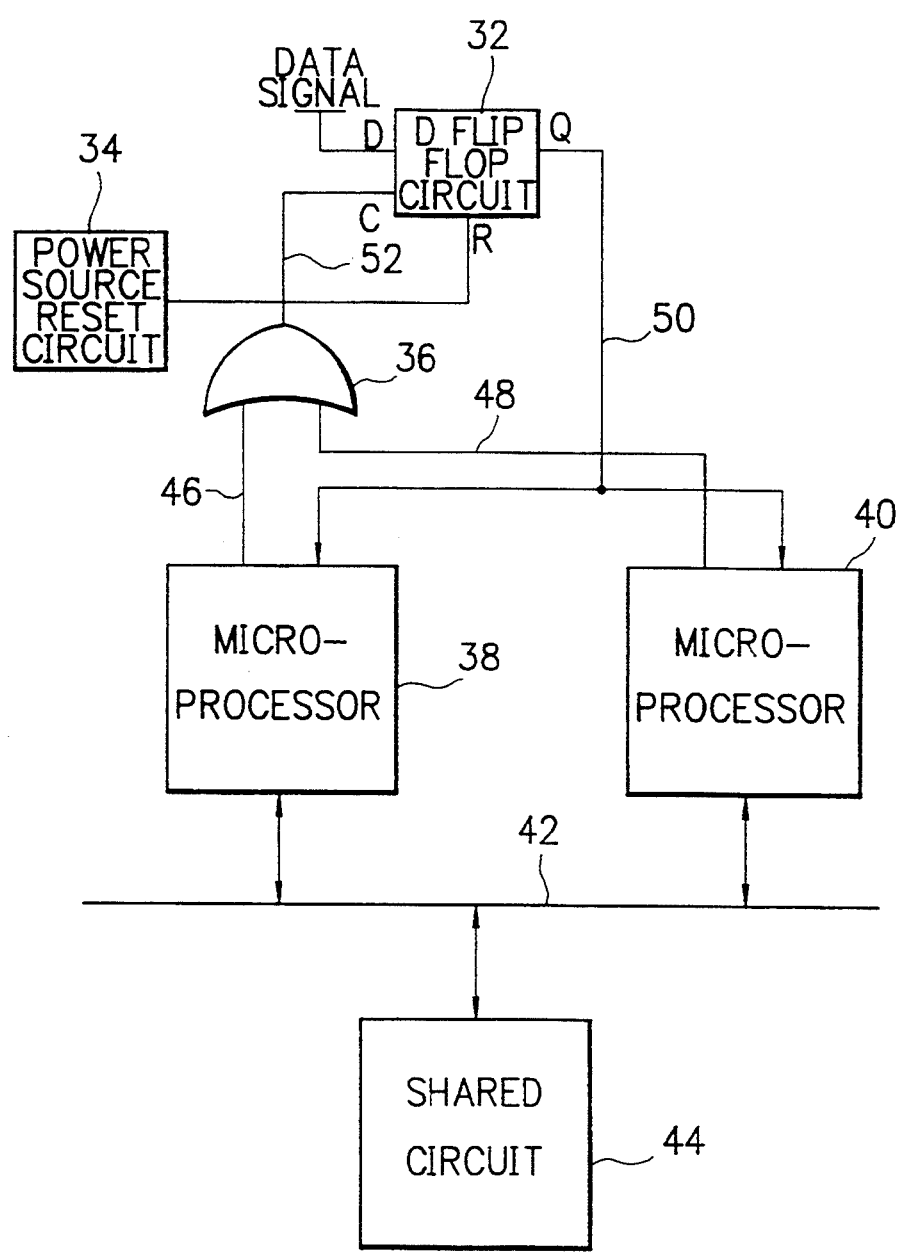
FIG. 2 is a block diagram schematically showing the constitution of an embodiment of a multiprocessor system in accordance with the present invention.
Figure 3:
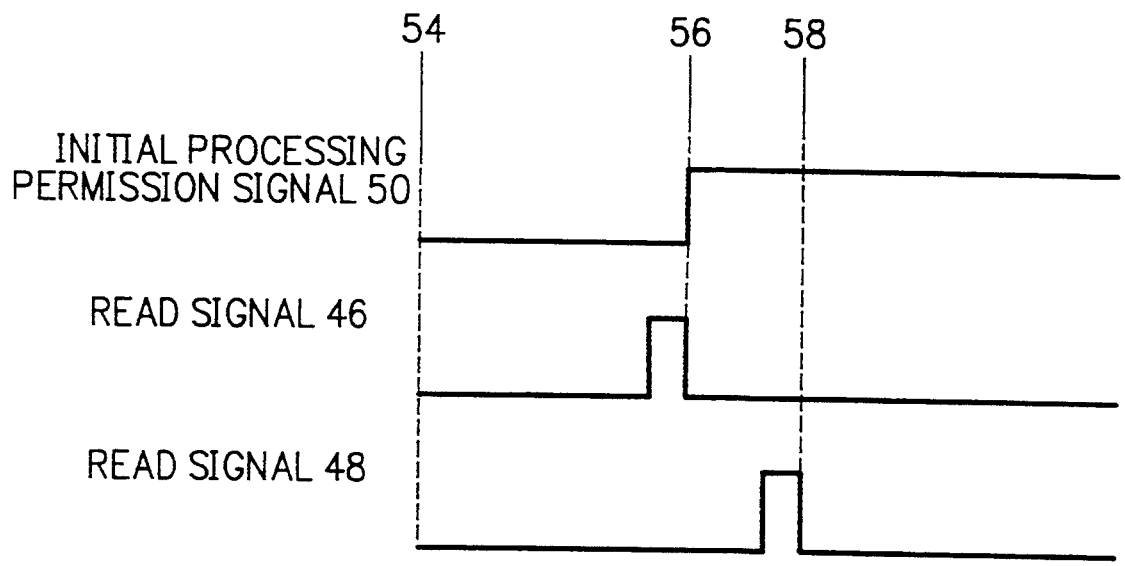
FIG. 3 is a signal timing chart showing operation timings of signals generated after the FIG. 2 system is powered.

Referring now to FIGS. 2 and 3, description will be given of an embodiment of the present invention. FIG. 2 shows an embodiment of a multiprocessor system according to the present invention. This system includes a D flip flop circuit 32, a power source reset circuit 34, an OR gate 36, microprocessors 38 and 40, and a shared circuit 44.

The microprocessors 38 and 40 are connected via a shared control line 42 to the shared circuit 41. Each of these microprocessors 38 and 40 monitors an initial processing permission signal 50 supplied from the D flip flop circuit 32. When the signal 50 is at a low level, the microprocessor having monitored the signal 50 carries out the initial processing for the shared circuit 44 via the shared control line 42. In addition, while monitoring the signal 50, the microprocessor 38 or 40 outputs a read signal 46 or 48, respectively. As shown in FIG. 3, the read signals 46 and 48 are at a high level. After a predetermined period time is elapsed in this state, these signals return to a low level.

On receiving the read signal 46 or 48 respectively from the microprocessor 38 or 40, the OR gate 36 outputs a trigger signal 52 to the D flip flop circuit 32.

The D flip flop circuit 32 receives at a data terminal D thereof a high-level signal as a data signal from a device external with respect to the multiprocessor system. When this circuit 32 receives at a clock terminal C thereof the trigger signal 52, the initial processing permission signal 50 from the D flip flop circuit 32 is changed from the low level to the high level. However, when a reset signal is supplied to the D flip flop circuit 32 from the power source reset circuit 34, the initial processing permission signal 50 is kept at the low level.

The power source reset circuit 34 keeps its output at a low-level for several milliseconds after the multiprocessor system is powered. The circuit 34 then outputs a high-level signal to reset the D flip flop circuit 32 and thereafter outputs again a low-level signal to release the reset operation, which resultantly sets the initial processing permission signal 50 from the D flip flop circuit 32 to the low level.

Next, the operation of the multiprocessor system of FIG. 2 will be described by referring to the signal timing chart of FIG. 3.

When the system is powered at a point 54, the D flip flop circuit 32 is reset and hence the initial processing permission signal 50 is at a low level.

Subsequently, the microprocessor 38 of FIG. 2 monitors the signal 50 to recognize that the signal 50 is at the low level and consequently achieves the initial processing for the shared circuit 44 via the shared control line 42. Moreover, while monitoring the signal 50, the microprocessor 38 simultaneously outputs the read signal 46. When the read signal 46 is delivered to the OR gate 36, the trigger signal 52 from the gate 86 is accordingly set to a high level. When the trigger signal 52 at the high level is supplied to the clock terminal C of the D flip flop circuit 32 at the timing 56, the initial processing permission signal 50 from the D flip flop circuit 32 is changed from the low level to a high level.

Thereafter, even when the other microprocessor 40 monitors the initial processing permission signal 50 and simultaneously outputs a read signal 48 to the OR gate 36, the initial processing is not achieved for the shared circuit 44 since the permission signal 50 is at a high level as shown in FIG. 3.

The trigger signal 52 from the OR gate 36 is set to a high level after the read signal 46 is produced; in consequence, the permission signal 50 from the D flip flop circuit 32 is kept at the high level.

As above, in accordance with this system of the present invention, when achieving the initial processing for the shared circuit 44, the microprocessor 38 or 40 monitors the initial processing permission signal 50 produced from the D flip flop circuit 32. When the signal 50 thus monitored is at a low level, the pertinent microprocessor conducts the initial processing for the shared circuit 44. In addition, while monitoring the signal 50 from the circuit 32, the microprocessor 38 or 40 respectively sends the read signal 46 or 48 to the OR gate 36. The trigger signal 52 produced from the OR gate 36 is set to a high level after the read signal 46 or 48 is generated whichever first generated; consequently, the permission signal generated from the flip flop circuit 32 is also set to a high level.

In consequence, when the initial processing is achieved for the shared circuit 44 by either one of the microprocessors 38 and 40, the other one microprocessor is inhibited from conducting the initial processing for the shared circuit 44. Furthermore, in a case where a failure occurs in either one of the microprocessors 38 and 40 and hence it is impossible to achieve the initial processing, the other microprocessor in the normal state monitors the initial processing permission signal 50 to carry out the initial processing for the shared circuit 44.

As above, according to the multiprocessor system of the present invention, when determining the microprocessor which conducts the initial processing for the shared circuit, the initial processing permission signal is monitored. As a result, the initial processing is accomplished for the shared circuit by the microprocessor monitoring the initial processing permission signal when the signal thus monitored is at a low level. Moreover, in concurrence with the monitoring operation, the trigger signal is sent via an OR gate to a D flip flop circuit producing the initial processing permission signal so as to change the state of the permission signal, thereby preventing the other microprocessor from conducting the initial processing. In consequence, when the microprocessors are operating in the normal state, the initial processing is ordinarily carried out for the shared circuit. In contrast therewith, when a failure occurs in one of the microprocessors, the initial processing can be thus accomplished by another microprocessor to start the operation of the multiprocessor system.

Moreover, at an occurrence of an abnormal operation in either one of the microprocessors, another microprocessor in the normal state monitors the abnormal state and generates a signal notifying the abnormality. Consequently, a monitoring apparatus installed at a separate position can recognize and report the abnormal microprocessor at once. As a result, also when the multiprocessor system is installed at a remote place, such an abnormal condition can be immediately detected by the operator monitoring the system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A multiprocessor system including a plurality of microprocessors and a shared circuit connected via a shared control line to the plurality of microprocessors, the system comprising:
   resetting means activated when the multiprocessor system is powered, for producing a reset signal;
   OR gate means for generating a logical sum of read signals sent from the microprocessors; and
   D flip-flop circuit means for receiving said reset signal from said resetting means at a first terminal, and for receiving an output signal produced by said OR gate means at a second terminal, then receiving a data signal fed from a device external to the multiprocessor system at a third terminal, said D flip-flop circuit means being effective for enabling a given one of said plurality of microprocessors to conduct an initial processing for the shared circuit, and for producing an initial processing permission signal to inhibit other ones of said microprocessors from carrying out the initial processing;

said D flip-flop circuit means producing, after being reset by said resetting means, an initial processing signal denoting an inhibit state on receiving the output signal from said OR gate means, and the data signal, and each of said microprocessors being effective for outputting, on receiving the initial processing permission signal, a read signal to said OR gate means so as to carry out the initial processing for the shared circuit when the signal is in a permission state and for refraining from conducting the initial processing for the shared circuit when the signal is in an inhibit state.

2. A system as claimed in claim 1, wherein said OR gate means outputs, on receiving the read signal from either one of said plurality of microprocessors, an output signal to said D flip flop circuit.

3. The multiprocessor system of claim 1 wherein said first terminal is a resetting terminal, said second terminal is a clock terminal and said third terminal is a data terminal of said D flip-flop circuit means.

* * * * *